US009531850B2

(12) United States Patent
Nainar et al.

(10) Patent No.: US 9,531,850 B2
(45) Date of Patent: Dec. 27, 2016

(54) INTER-DOMAIN SERVICE FUNCTION CHAINING

(71) Applicant: CISCO TECHNOLOGY, INC., San Jose, CA (US)

(72) Inventors: Nagendra Kumar Nainar, Morrisville, NC (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 14/560,146

(22) Filed: Dec. 4, 2014

(65) Prior Publication Data

US 2016/0165014 A1 Jun. 9, 2016

(51) Int. Cl.
*H04L 12/28* (2006.01)
*H04L 29/06* (2006.01)
*H04L 12/715* (2013.01)

(52) U.S. Cl.
CPC ............... *H04L 69/22* (2013.01); *H04L 45/04* (2013.01)

(58) Field of Classification Search
CPC .. H04L 69/22; H04L 12/2605; H04L 47/2483; H04L 45/04; H04L 29/06
USPC ... 370/351–355, 392, 397, 399, 395.31, 409
See application file for complete search history.

(56) References Cited

U.S. PATENT DOCUMENTS

| | | | |
|---|---|---|---|
| 2007/0189165 A1* | 8/2007 | Johnson | E21B 47/12 370/230 |
| 2010/0080239 A1 | 4/2010 | Sergeev et al. | |
| 2010/0242055 A1 | 9/2010 | Aguilera et al. | |
| 2012/0033663 A1 | 2/2012 | Guichard et al. | |
| 2013/0227071 A1 | 8/2013 | Valluri et al. | |
| 2013/0254327 A1 | 9/2013 | Gero et al. | |
| 2013/0346629 A1 | 12/2013 | Wang et al. | |
| 2014/0269699 A1 | 9/2014 | Filsfils et al. | |
| 2014/0351452 A1* | 11/2014 | Bosch | H04L 67/10 709/242 |
| 2014/0355617 A1* | 12/2014 | Brown | H04L 12/28 370/401 |
| 2015/0236948 A1* | 8/2015 | Dunbar | H04L 45/22 370/225 |

(Continued)

FOREIGN PATENT DOCUMENTS

| | | |
|---|---|---|
| WO | WO2013102486 | 7/2013 |
| WO | WO2014189670 | 11/2014 |

OTHER PUBLICATIONS

IETF Internet Draft "Network Service Header", draft-quinn-sfc-nsh-03.txt, P. Quinn et al., Jul. 3, 2014.

*Primary Examiner* — Mang Yeung
(74) *Attorney, Agent, or Firm* — Cindy Kaplan

(57) ABSTRACT

In one embodiment, a method includes receiving a packet in a service function chain at a network device located at a border of a first administrative domain, the packet comprising a service function path identifier and a service index, processing the packet at the network device, wherein processing comprises modifying the packet based on the service function path identifier and the service index to direct the packet to a second administrative domain, and forwarding the packet from the network device to the second administrative domain for processing in the service function chain. The service function chain extends over the first and second administrative domains. An apparatus and logic are also disclosed herein.

20 Claims, 5 Drawing Sheets

(56) References Cited

U.S. PATENT DOCUMENTS

| 2016/0028640 A1* | 1/2016 | Zhang | H04L 45/306 |
|---|---|---|---|
| | | | 370/389 |
| 2016/0164776 A1* | 6/2016 | Biancaniello | H04L 45/306 |
| | | | 370/392 |

* cited by examiner

INTER-DOMAIN SERVICE FUNCTION CHAINING

TECHNICAL FIELD

The present disclosure relates generally to communications networks, and more particularly, to inter-domain service function chaining.

BACKGROUND

Network services are widely deployed and important in many networks. Services provide a range of features such as security, wide area network acceleration, firewall, server load balancing, deep packet inspection, intrusion detection service, and Network Address Translation (NAT). Network services may be employed at different points in a network infrastructure, including for example, wide area network, data center, campus, and the like. The services may be applied as part of a service chain.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
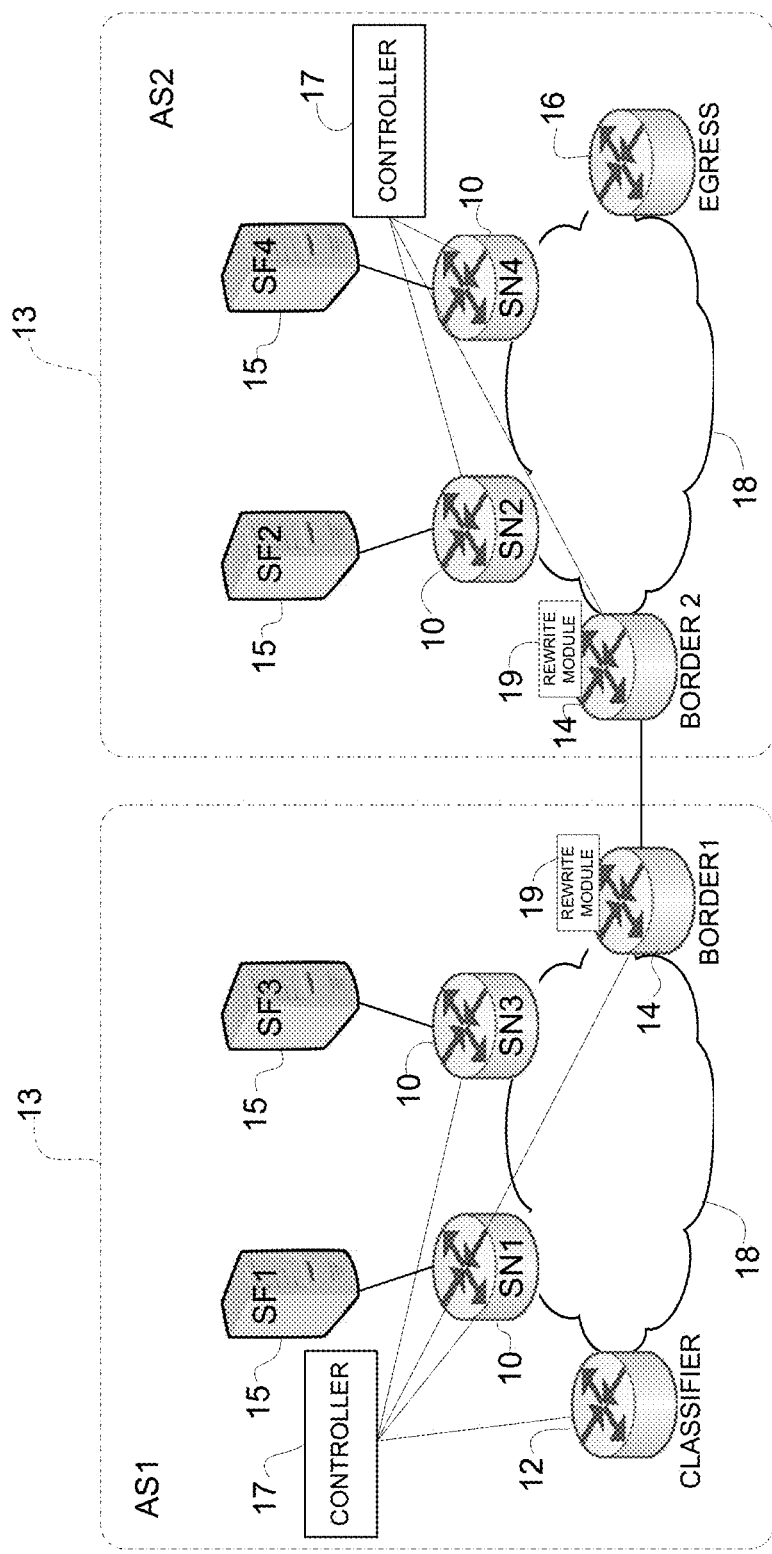
FIG. 1 illustrates an example of a network in which embodiments described herein may be implemented.

In one embodiment, a method generally comprises receiving a packet in a service function chain at a network device located at a border of a first administrative domain, the packet comprising a service function path identifier and a service index, processing the packet at the network device, wherein processing comprises modifying the packet based on the service function path identifier and the service index to direct the packet to a second administrative domain, and forwarding the packet from the network device to the second administrative domain for processing in the service function chain. The service function chain extends over the first and second administrative domains.

In another embodiment, an apparatus generally comprises a processor for processing a packet received in a service function chain at a border of a first administrative domain, the packet comprising a service function path identifier and a service index, modifying the packet based on the service function path identifier and the service index, and forwarding the packet to a second administrative domain. The apparatus further comprises memory for storing instructions for modifying the packet based on the service function path identifier and the service index. The service function chain extends over the first and second administrative domains.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

A service chain is a data structure defining a set of service nodes hosting various service functions and the order in which the service functions should be applied to the data of selected traffic. Service chaining involves the interception of traffic and directing of traffic through a series of service nodes (i.e., physical or virtual devices) that each support one or more service functions. A path instantiated from ingress/classifier to egress via various service functions is known as a Service Function Path (SFP).

Network Service Header (NSH) is a dataplane header that may be added to frames/packets for use in service chains. The header contains information used for service chaining, as well as metadata added and consumed by network nodes and service elements. NSH may be used across a range of devices, both physical and virtual. In one example, NSH may be implemented as described in IETF draft "Network Service Header", P. Quinn et al., Jul. 3, 2014 (draft-quinn-sfc-nsh-03.txt).

Conventional techniques for service chaining are typically structured for a single administrative domain (routing domain, autonomous system) under the control of a single control-plane entity. With the recent increase in cloud based services, it may be possible to have service functions distributed in various administrative domains, in which case there would be a need to span the service chain to multiple administrative domains. For example, based on a service function and its location, a packet may need to traverse two or more administrative domains.

The embodiments described herein allow a service function chain to span multiple administrative domains without restriction as to service function location or processing order. In certain embodiments, header rewrite may be used as a service function on border nodes to direct traffic to a different administrative domain. As described below, a service function path may be instantiated in a way that the border node rewrite occurs before sending a packet to the next domain. For example, in certain embodiments, the SFP may be instantiated with a Service Index (SI) pointing to a rewrite header with the next domain associated SFP/SI details. The combination of service path identifier (ID) and service index may be used to apply the correct service function in the correct order regardless of the location of the service function. The embodiments allow a service function chain to span any number of administrative domains, in any order, and with no need for address leaking between domains.

Referring now to the drawings, and first to FIG. 1, a network in which embodiments described herein may be implemented is shown. For simplification, only a small number of nodes are shown. The embodiments operate in the context of a data communication network including multiple network devices. The network may include any number of network devices in communication via any number of nodes (e.g., routers, switches, controllers, gateways, or other network devices), which facilitate passage of data within the network.

The network shown in the example of FIG. 1 includes a plurality of network devices 10, 12, 14, 16 (e.g., routers) located in two administrative domains 13 (Autonomous System 1 (AS1), Autonomous System 2 (AS2)). Each autonomous system AS1, AS2 may be assigned a unique number (Autonomous System Number (ASN)) that identifies the AS. The network may include any number of administrative domains (autonomous systems, routing domains) 13, each controlled by a single technical administration entity and sharing a common routing policy. The administrative domains 13 are used to divide networks into individual routing domains where local routing policies are applied. The administrative domains 13 may each include any number of networks 18, and each network may include any number of edge devices 10, 12, 14, 16 or intermediate (core) nodes (e.g., routers, switches, access layer devices, aggregation layer devices, gateways, or other network devices).

In the example shown in FIG. 1, each AS13 includes a border node 14 (border1, border2) through which the two autonomous systems communicate. The border nodes 14 may be routers or other suitable network devices. There may be any number of network devices interposed between the border nodes 14.

The networks 18 shown in FIG. 1 each include a plurality of service nodes 10, classifier/ingress router 12 or egress router 16, and border router 14. The term 'router' as used herein may refer to any network device (e.g., router, switch/router) configured to perform routing functions. In the example shown in FIG. 1, AS1 includes a classifier 12 and border router (border1) 14 in communication with a border router (border2) in AS2. AS2 further includes an egress router 16. The classifier (head-end node) 12 is located at a start of a service chain and egress node 16 is located at an end of the service chain. The classifier 12 may perform classification, impose a network service header, and create a service path. In the example shown in FIG. 1 node 12 is referred to as a classifier or ingress node since it is a first node in a service chain (described below) and node 18 operates as an egress node in the service chain. It is to be understood that nodes 12, 16 may operate as an ingress node/classifier or egress node in different service chains.

The service nodes 10 each host or support one or more service functions 15 for application to a payload of traffic passing through the respective service node. In the service function chaining architecture, the node 10 may be referred to as a "service function forwarder" based on the function performed by the node. The service node 10 is a physical or virtual element that hosts one or more service functions and has one or more network locators associated therewith for reachability and service delivery. In the example shown in FIG. 1, AS1 hosts service functions SF1 and SF3 at service nodes SN1 and SN3, respectively. AS2 hosts service functions SF2 and SF4 at service nodes SN2 and SN4, respectively. The service function 15 is responsible for specific treatment of received packets and may operate at the network layer or other OSI (Open Systems Interconnection) layer. The service function 15 may be a virtual instance or embedded in a physical network element. For example, the service node 10 may be a physical device that hosts one or more service functions. The service node 10 may be any network device (e.g., commodity hardware) that can host any service function. Multiple service functions may be embedded in the same network element. The service function 15 may be performed at another node in communication with the service node 10, as shown in FIG. 1, or implemented at the service node 10. The border node 19 may also have a service function attached thereto.

One or more of the nodes 10, 12, 14, 16 may communicate with a controller 17 (e.g., ODL (open daylight) controller, SDN (software-defined networking) controller, or other centralized server). For example, each administrative domain 13 may include a controller 17 in communication with classifier nodes 12, service nodes 10, and border nodes 14 for that domain. The controller 17 may be a physical device or a virtual element, and may be located at one network device or distributed throughout the network at different network devices in communication with one another or a central controller, for example. The controller 17 (or another network device) may include service chaining logic that defines one or more service chains. As described below, the controller 17 may also be used to program the border routers 14 with rewrite instructions at rewrite module 19.

The service nodes 10 may be used to implement one or more service function chains (service chains). The service function chain defines an ordered set of service functions to be applied to packets (frames) selected as a result of classification. A service function path is the instantiation of a service function chain in the network.

In certain embodiments, the dataplane for service chaining is defined in a network service header (NSH). The NSH is a data plane header added to frames/packets and contains information needed for service chaining, as well as metadata added and consumed by network nodes (e.g., service nodes 10) and service elements (e.g., service functions 15). The ingress node 12 may, for example, impose an NSH with a service function path identifier (SFP ID) and service index (SI), which will follow a service path and apply a set of services. The service node 10 uses the service index in the NSH to identify the service function and forward the packet for processing. It is to be understood that the service header, service function path identifier, and service index described herein are only examples and that other types of headers or identifiers may be used without departing from the scope of the embodiments. For example, the service function path identifier may be any type of identifier used to indicate a service path for use by participating nodes for path selection. The term 'service index' as used herein may refer to any type of network locator that provides location within the service path. In certain embodiments, the service header includes the service path identifier and service index.

As described in the examples below, packets follow a service function path from the classifier 12 through the requisite service functions 15. The owner of administrative domain AS1 may, for example, desire a service that consists of {SF1, SF2, SF3, SF4} but only a sub-set of the desired service functions are available within the local domain AS1. Construction of the service chain therefore needs to span both administrative domains AS1 and AS2. The controller 17 may build an inter-domain service chain using one or more local service functions and one or more remote service functions. For example, a service chain may be defined in the network shown in FIG. 1 as SFP={SF1, SF2, SF3, SF4}. Due to the nature of the service functions and locations thereof, a packet may need to traverse back and forth between the two administrative domains 13.

In certain embodiments, the border router 14 may receive a packet in a service chain, modify the header (e.g., NSH) based on a service function path and service index identified in the packet, and forward the modified packet to another administrative domain in the service chain to provide inter-domain service function chaining. As described in detail below, the embodiments may use header rewrite 19 at the border node 14 as a service function to modify the packet. The SFP may be instantiated, for example, over the border nodes 14 with a service index pointing to rewrite the header with the next domain and associated SFP/service index details. The border node 14 may rewrite the header when needed, as per the SFP, and forward the packet to the next domain for processing. The SFP ID and service index may be used to apply the correct service function in the correct order irrespective of the location of the service function, and thereby provide inter-domain service function chaining.

It is to be understood that the network shown in FIG. 1 is only an example and the embodiments described herein may be implemented in networks comprising different network topologies or network devices, or using different network protocols, without departing from the scope of the embodiments. For example, there may be any number or type of administrative domains 13, networks 18, service nodes 10, or controllers 17. The embodiments may operate over VxLAN (Virtual Extensible LAN), Transmission Control Protocol (TCP), UDP (User Datagram Protocol), or any other suitable transport.

Figure 2:
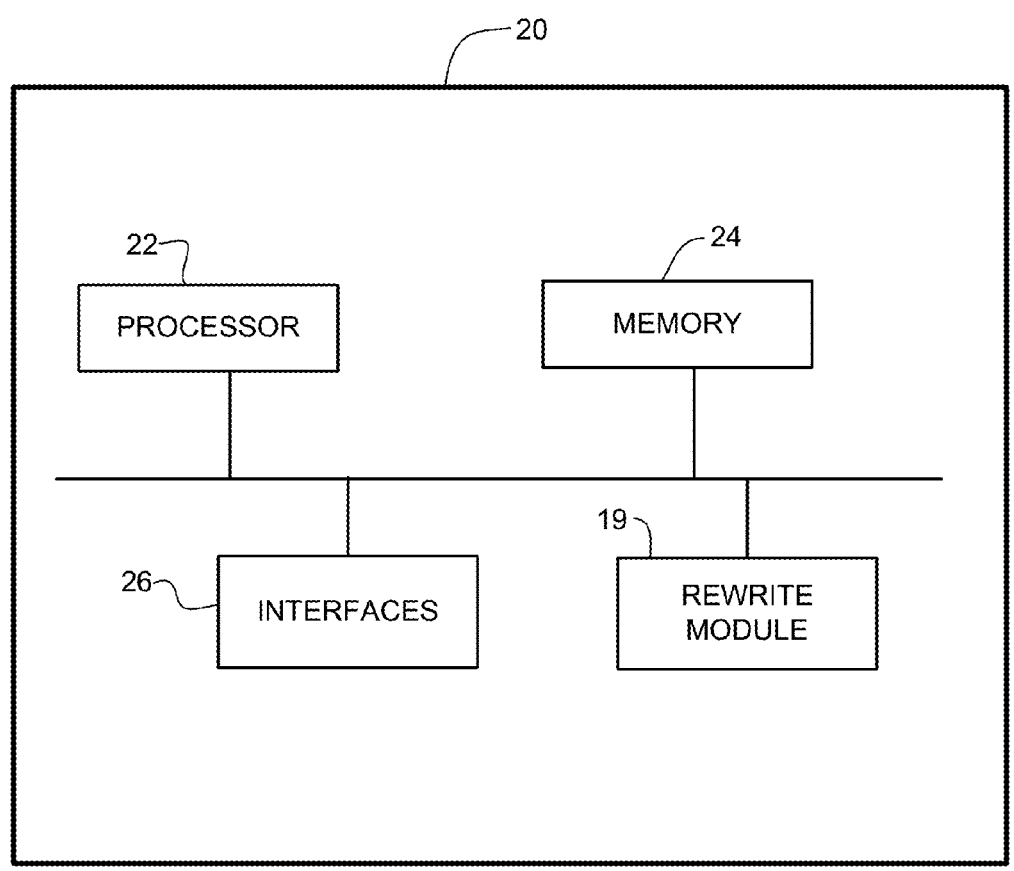
FIG. 2 depicts an example of a network device useful in implementing embodiments described herein.

FIG. 2 illustrates an example of a network device 20 (e.g., border router 14 in FIG. 1) that may be used to implement the embodiments described herein. In one embodiment, the network device 20 is a programmable machine that may be implemented in hardware, software, or any combination thereof. The network device 20 includes one or more processor 22, memory 24, network interfaces 26, and rewrite module 19.

Memory 24 may be a volatile memory or non-volatile storage, which stores various applications, operating systems, modules, and data for execution and use by the processor 22. For example, components of rewrite module 19 (e.g., code, logic, software, firmware, etc.) may be stored in memory 24.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In certain embodiments, logic may be encoded in non-transitory computer-readable media.

The network interfaces 26 may comprise any number of interfaces (linecards, ports) for receiving data or transmitting data to other devices. As shown in FIG. 1, border routers 19 each comprise interfaces for transmitting packets on the service chain. The network interface 26 may include, for example, an Ethernet interface for connection to a computer or network.

It is to be understood that the network device 20 shown in FIG. 2 and described above is only an example and that different configurations of network devices may be used. For example, the network device 20 may further include any suitable combination of hardware, software, algorithms, processors, devices, components, or elements operable to facilitate the capabilities described herein.

Figure 3:
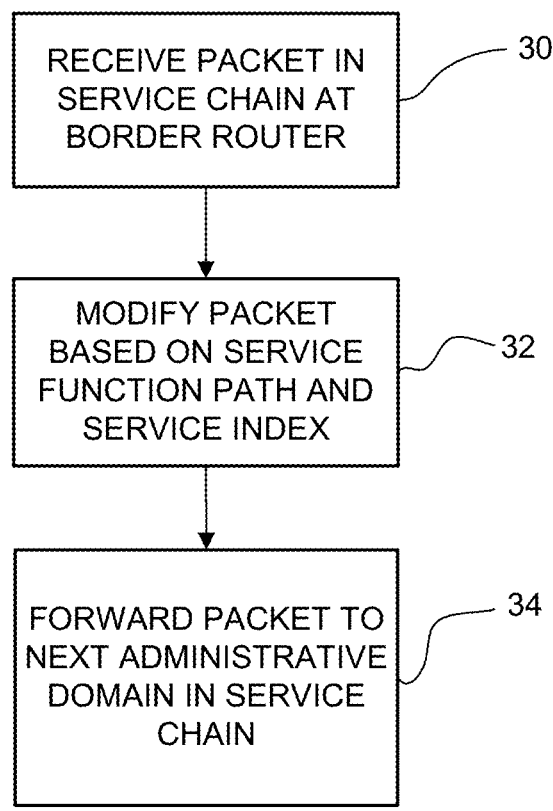
FIG. 3 is a flowchart illustrating an overview of a process for inter-domain service function chaining, in accordance with one embodiment.

FIG. 3 is a flowchart illustrating an overview of a process for inter-domain service function chaining, in accordance with one embodiment. At step 30 a network device (e.g., border router 14 in FIG. 1) located in a first administrative domain (e.g., AS1) receives a packet in a service function chain extending over at least two different administrative domains. The packet comprises a service function path identifier and a service index. The border router 14 modifies the packet based on the service function path identifier and service index (step 32). The border router 14 may, for example, rewrite a packet header (e.g., NSH) according to the service function path. The border router 14 then forwards the packet to a second administrative domain (e.g., AS2) specified in the modified packet for processing of the packet in the service function chain the second administrative domain (step 34).

It is to be understood that the flowchart shown in FIG. 3 and described above is only an example and that steps may be added, combined, or modified, without departing from the scope of the embodiments.

The following example describes implementation of inter-domain service function chaining in the network of FIG. 1, in accordance with one embodiment. The service path is defined as SFP={SF1, SF2, SF3, SF4}. Due to the nature of the service functions and their locations, the packet needs to traverse back and forth between the two administrative domains (AS1, AS2). When the SFP is instantiated, the border nodes 14 are instructed to rewrite the domain ID and Service Path ID based on the service index. For example, service node SN1 hosting SF1 is instructed to send a packet on the service chain to Border1 after processing the packet as part of the SFP. Border1 may be programmed as follows:

Border1:

```
When {SFP-ID=100} {
When{Service_Index=2} {
Rewrite NSH header;
Set SFP-ID=200;
Set Service_Index=3;
Forward to Border2;
}
When{Service_Index=6}{
Set Service_Index=7;
Forward to SN3;
}
When{Service_Index=8} {
Rewrite NSH header;
Set SFP-ID=200;
Set Service_Index=9;
Forward to Border2;
}
```

Border2 may be programmed as follows:

```
When {SFP-ID=200} {
When{Service_Index=3}{
Set Service_Index=4;
Forward to SN2;
}
When{Service_Index=5} {
Rewrite NSH header;
Set SFP-ID=100;
Set Service_Index=6;
Forward to Border1;
}
When{Service_Index=9}{
Set Service_Index=10;
Forward to SN4;
}
```

Figure 4:
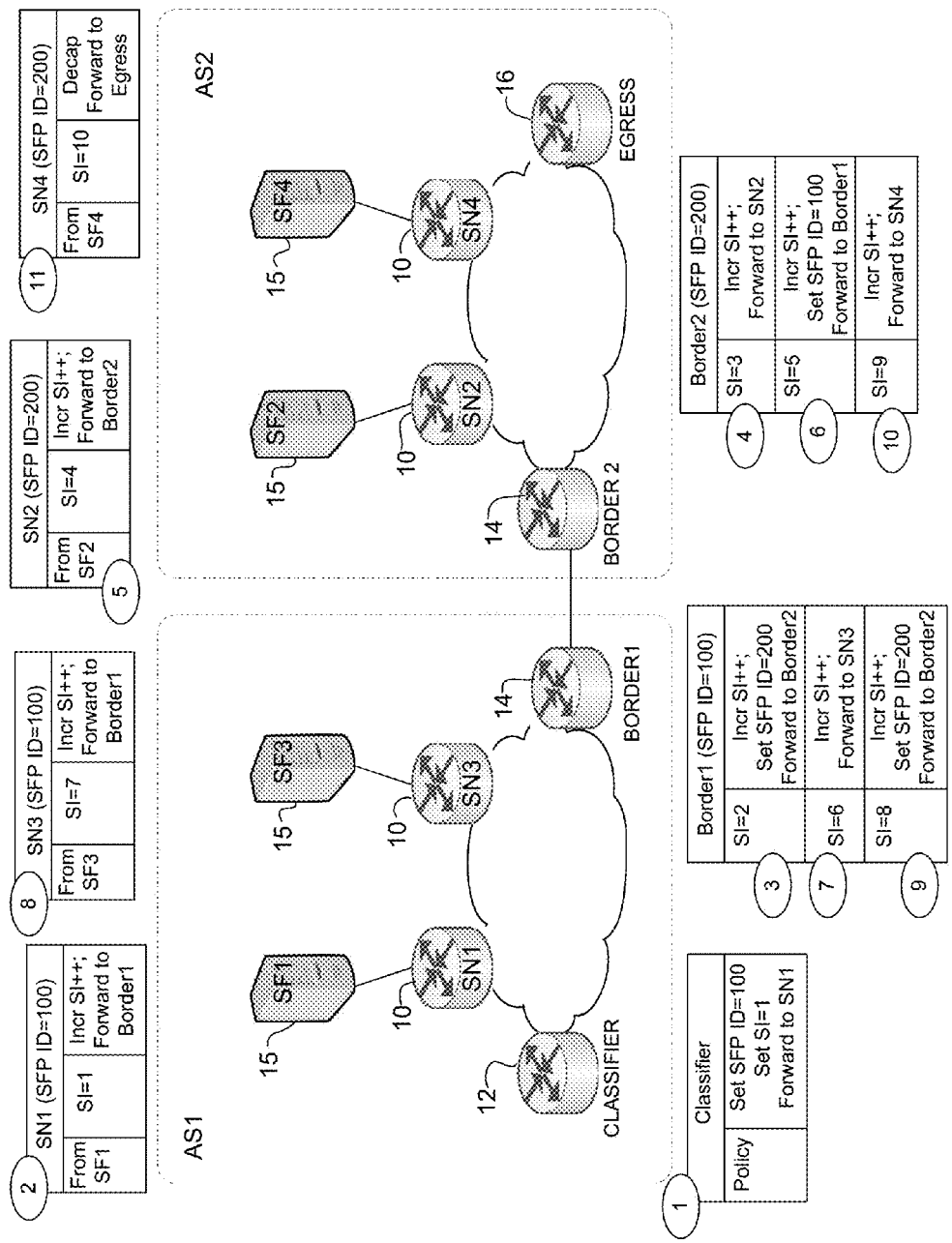
FIG. 4 is a diagram illustrating an example of inter-domain service function chaining in the network of FIG. 1, in accordance with one embodiment.

FIG. 4 illustrates the processing of a packet based on the service chain and programming described above. Upon receiving the packet at classifier 12, the classifier classifies the packet and identifies the SFP ID as 100 to be applied (step 1 in FIG. 4). The classifier 12 forwards the packet to service node SN1. Service node SN1 receives the packet with SFP ID=100 and Service Index (SI)=1 (step 2). After processing by service function SF1, service node SN1 increments the SI to 2 and forwards the packet to Border1. Border1 rewrites the NSH with SFP ID=200, increments the SI to 3 and forwards the packet to Border2 (step 3). Upon receiving the packet, Border 2 increments the SI to 4 and forwards the packet to service node SN2 (step 4). Service node SN2 receives the packet with SFP ID=200 and Service Index=4 (step 5). After processing by service function SF2, service node SN2 increments the SI to 5 and forwards the packet to Border2. Border2 then rewrites the NSH header with SFP ID=100, increments the SI to 6 and forwards the packet to Border1 (step 6). Upon receiving the packet, Border1 increments the SI to 7 and forwards the packet to service node SN3 (step 7). Service node SN3 receives the packet with SFP ID=100 and Service Index=7 (step 8). After processing by service function SF3, service node SN3 increments the SI to 8 and forwards the packet to Border1. Border1 rewrites the NSH header with SFP ID=200, increments the SI to 9 and forwards the packet to Border2 (step 9). Border2 then increments the SI to 10 and forwards the packet to service node SN4 (step 10). Service node SN4 receives the packet with SFP ID=200 and Service Index=10 (step 11). After processing by service function SF4, service node SN4 decapsulates the packet (e.g., removes the NSH) and forwards the packet to egress node 16.

Figure 5:
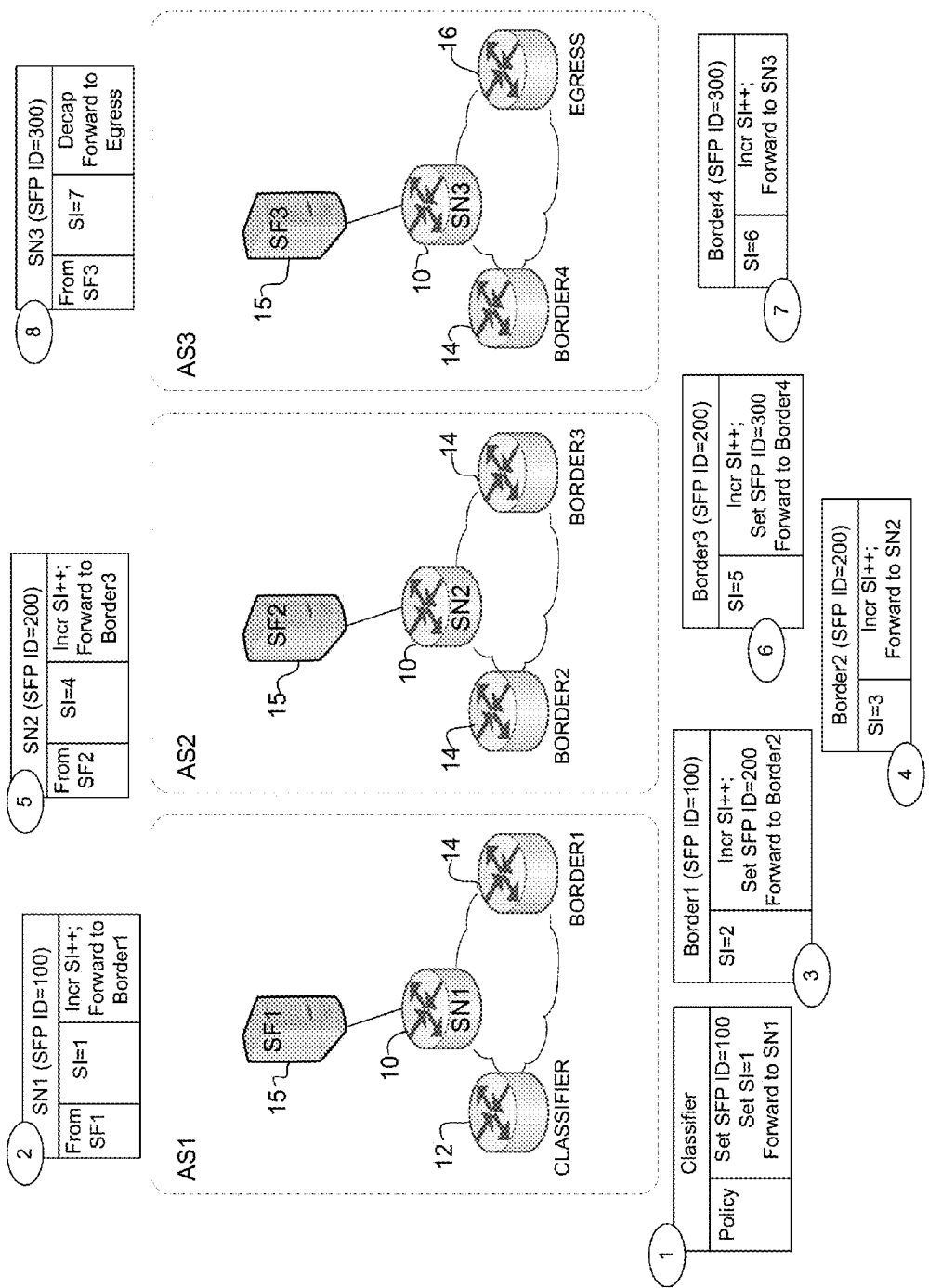
FIG. 5 is a diagram illustrating an example of inter-domain service function chaining in another network topology, in accordance with one embodiment.

As previously noted, the embodiments described herein may be implemented in networks comprising more than two administrative domains. FIG. 5 illustrates an example involving three autonomous systems (AS1, AS2, AS3). In this example, each AS includes one service node and one service function.

Upon receiving a packet, classifier 12 classifies the packet and identifies the SFP ID as 100 to be applied (step 1 in FIG. 5). The classifier 12 forwards the packet to SN1. Service node SN1 receives the packet with SFP ID=100 and Service Index (SI)=1 (step 2). After processing by service function SF1, service node SN1 increments the SI to 2 and forwards the packet to Border1. Border1 rewrites the NSH with SFP ID=200, increments the SI to 3 and forwards the packet to Border2 (step 3). Upon receiving the packet, Border 2 increments the SI to 4 and forwards the packet to SN2 (step 4). Service node SN2 receives the packet with SFP ID=200 and Service Index=4 (step 5). After processing by service function SF2, service node SN2 increments the SI to 5 and forwards the packet to Border3. Border3 then rewrites the NSH header with SFP ID=300, increments the SI to 6, and forwards the packet to Border4 (step 6). Upon receiving the packet, Border4 increments the SI to 7 and forwards the packet to service node SN3 (step 7). Service node SN3 receives the packet with SFP ID=300 and Service Index=7 (step 8). After processing by service function SF3, the service node decapsulates the packet (e.g., removes the NSH) and forwards the packet to the egress node 16.

As can be observed from the forgoing, the embodiments described herein provide a number of advantages. One or more embodiments allow a service chain to extend over any number of administrative domains and pass into any portion of the administrative domains in any order, without the need for address leaking between domains, thereby retaining privacy between domains. Furthermore, there is no need for classification on the ingress node of a second domain since the packet is modified while exiting the first domain.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
    receiving a packet in a service function chain at a network device located at a border of a first administrative domain, the packet comprising a service function path identifier and a service index, said service function chain defining a set of service nodes hosting service functions and an order for applying said service functions;
    processing the packet at the network device, wherein processing comprises modifying the packet based on said service function path identifier and said service index to direct the packet to a second administrative domain; and
    forwarding the packet from the network device to said second administrative domain for processing in said service function chain;
    wherein said service function chain extends over said first and second administrative domains; and
    wherein said first administrative domain and said second administrative domain communicate via the network device at the border of said first administrative domain, each of said first and second administrative domains defining a routing domain where local routing policies are applied.

2. The method of claim 1 wherein modifying the packet comprises rewriting a header in the packet.

3. The method of claim 2 wherein rewriting the header comprises rewriting said service function path identifier.

4. The method of claim 2 wherein the header comprises a network service header comprising said service function path identifier and said service index.

5. The method of claim 1 wherein modifying the packet comprises increasing said service index.

6. The method of claim 1 further comprising receiving at the network device, a packet from said second administrative domain and forwarding the packet on said service chain in said first administrative domain.

7. The method of claim 1 wherein said service chain comprises a first service function path defined within said first administrative domain and a second service function path defined within said second administrative domain.

8. The method of claim 1 wherein the network device is programmed by a controller in said first administrative domain to rewrite said service function path identifier based on said service index.

9. The method of claim 1 wherein the network device comprises a first router in communication with a service node in said first administrative domain and a second router in said second administrative domain.

10. An apparatus comprising:
    a processor for processing a packet received in a service function chain at a border of a first administrative domain, the packet comprising a service function path identifier and a service index, modifying the packet based on said service function path identifier and said service index, and forwarding the packet to a second administrative domain; and
    memory for storing instructions for modifying the packet based on said service function path identifier and said service index;

wherein the service function chain defines a set of service nodes hosting service functions and an order for applying said service functions and extends over said first and second administrative domains; and wherein said first administrative domain and said second administrative domain communicate via the network device at the border of said first administrative domain, each of said first and second administrative domains defining a routing domain where local routing policies are applied.

11. The apparatus of claim 10 wherein modifying the packet comprises rewriting a header in the packet.

12. The apparatus of claim 11 wherein rewriting the header comprises rewriting said service function path identifier.

13. The apparatus of claim 11 wherein the header comprises a network service header comprising said service function path identifier and said service index.

14. The apparatus of claim 10 wherein modifying the packet comprises increasing said service index.

15. The apparatus of claim 10 wherein the processor is further operable to process a packet received from said second administrative domain and forward the packet on the service chain in said first administrative domain.

16. The apparatus of claim 10 wherein the service chain comprises a first service function path defined within said first administrative domain and a second service function path defined within said second administrative domain.

17. The apparatus of claim 10 wherein said instructions are received from a controller in said first administrative domain to rewrite said service function path identifier based on said service index.

18. The apparatus of claim 10 wherein the apparatus comprises a first router operable for communication with a service node in said first administrative domain and a second router in said second administrative domain.

19. Logic encoded on one or more non-transitory computer readable media for execution and when executed operable to:

process a packet received in a service function chain at a border of a first administrative domain, the packet comprising a service function path identifier and a service index, said service function chain defining a set of service nodes hosting service functions and an order for applying said service function;

modify the packet based on said service function path identifier and said service index; and forward the packet to a second administrative domain for processing of the packet in said service function chain;

wherein the service function chain extends over said first and second administrative domains; and wherein said first administrative domain and said second administrative domain communicate via the network device at the border of said first administrative domain, each of said first and second administrative domains defining a routing domain where local routing policies are applied.

20. The logic of claim 19 wherein said logic to modify the packet comprises logic operable to rewrite a header in the packet.

* * * * *